(12) United States Patent
Unno

(10) Patent No.: US 10,931,914 B2
(45) Date of Patent: Feb. 23, 2021

(54) IMAGE PLAYBACK DEVICE, DISPLAY DEVICE, AND TRANSMISSION DEVICE

(71) Applicant: MAXELL, LTD., Kyoto (JP)

(72) Inventor: Kyohei Unno, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/188,505

(22) Filed: Nov. 13, 2018

(65) Prior Publication Data

US 2019/0082139 A1 Mar. 14, 2019

Related U.S. Application Data

(63) Continuation of application No. 15/306,513, filed as application No. PCT/JP2014/062508 on May 9, 2014, now Pat. No. 10,171,770.

(51) Int. Cl.
*H04N 7/01* (2006.01)
*G09G 5/00* (2006.01)
(Continued)

(52) U.S. Cl.
CPC .......... *H04N 7/0135* (2013.01); *G09G 5/006* (2013.01); *G09G 5/36* (2013.01); *G11B 27/00* (2013.01);
(Continued)

(58) Field of Classification Search
CPC .......... H04N 7/0135; H04N 7/01; H04N 9/87; H04N 21/435; H04N 21/43635;
(Continued)

(56) References Cited

U.S. PATENT DOCUMENTS

2004/0246374 A1 12/2004 Mishima
2008/0151119 A1 6/2008 Suzuki
(Continued)

FOREIGN PATENT DOCUMENTS

JP 2008-244820 A 10/2008
JP 2011-004148 A 1/2011
(Continued)

OTHER PUBLICATIONS

International Search Report of PCT/JP2014/062508 dated Aug. 5, 2014.

*Primary Examiner* — Mishawn N. Hunter
(74) *Attorney, Agent, or Firm* — Mattingly & Malur, PC

(57) ABSTRACT

The system includes a display device causing a display unit to display video; a data transmission unit that transmits, to the display device, video data generated in a predetermined format based on information decoded from encoded information, and interpolation data for interpolating differences between the predetermined format and a format when decoding from the encoded information; an interpolation data selection unit that selects a kind of interpolation data to be transmitted to the display device, on the basis of priorities for a plurality of kinds of the interpolation data capable of being generated based on the encoded information; and a display processing unit that acquires the video data and the selected kind of the interpolation data in the display device, and causes the display unit to display video resulting from interpolation of the video data based on the interpolation data.

21 Claims, 13 Drawing Sheets

(51) Int. Cl.
  *G09G 5/36*       (2006.01)
  *H04N 21/4402*    (2011.01)
  *G11B 31/00*      (2006.01)
  *H04N 9/87*       (2006.01)
  *H04N 21/435*     (2011.01)
  *H04N 21/4363*    (2011.01)
  *H04N 21/462*     (2011.01)
  *G11B 27/00*      (2006.01)

(52) U.S. Cl.
  CPC ............. *G11B 31/006* (2013.01); *H04N 7/01* (2013.01); *H04N 9/87* (2013.01); *H04N 21/435* (2013.01); *H04N 21/43635* (2013.01); *H04N 21/4402* (2013.01); *H04N 21/440263* (2013.01); *H04N 21/4621* (2013.01); *G09G 2320/0613* (2013.01); *G09G 2320/08* (2013.01); *G09G 2340/0407* (2013.01); *G09G 2340/0428* (2013.01); *G09G 2340/0435* (2013.01); *G09G 2350/00* (2013.01); *G09G 2360/02* (2013.01); *G09G 2370/04* (2013.01); *G09G 2370/12* (2013.01)

(58) Field of Classification Search
  CPC ....... H04N 21/4402; H04N 21/440263; H04N 21/4621; G09G 5/006; G09G 5/36; G11B 27/00; G11B 31/06
  See application file for complete search history.

(56) References Cited

U.S. PATENT DOCUMENTS

| | | |
|---|---|---|
| 2009/0037952 A1 | 2/2009 | Hong |
| 2010/0111489 A1* | 5/2010 | Presler ................ H04N 5/3765 386/278 |
| 2010/0321578 A1 | 12/2010 | Wanaka |
| 2011/0022634 A1 | 1/2011 | Takata |
| 2013/0027610 A1 | 1/2013 | Fujita |
| 2014/0267908 A1 | 9/2014 | Hagenbuch |
| 2014/0282800 A1 | 9/2014 | Morita |
| 2015/0319494 A1 | 11/2015 | Dhanabalan |

FOREIGN PATENT DOCUMENTS

| | | |
|---|---|---|
| JP | 2013-174798 A | 9/2013 |
| JP | 2013-218002 A | 10/2013 |

* cited by examiner

FIG. 4

| NO. | AVAILABLE INTERPOLATION DATA | IMAGE FORMAT AFTER APPLICATION |
|---|---|---|
| 1 | RESOLUTION (8k4k) | 8k4k, 60Hz, 8bit/pixel |
| 2 | FRAME RATE (120Hz) | 4k2k, 120Hz, 8bit/pixel |
| 3 | BIT DEPTH (10bit/pixel) | 4k2k, 60Hz, 10bit/pixel |
| 4 | BIT DEPTH (12bit/pixel) | 4k2k, 60Hz, 12bit/pixel |
| 5 | FRAME RATE (120Hz) + BIT DEPTH (10bit/pixel) | 4k2k, 120Hz, 10bit/pixel |
| 6 | FRAME RATE (120Hz) + BIT DEPTH (12bit/pixel) | 4k2k, 120Hz, 12bit/pixel |

FIG. 6

| NO. | AVAILABLE INTERPOLATION DATA (ELEMENT) | ALLOCATION POINT |
|---|---|---|
| 1 | RESOLUTION (8k4k) | OMISSION |
| 2 | FRAME RATE (120Hz) | 2 |
| 3 | BIT DEPTH (10bit/pixel) | 1 |
| 4 | BIT DEPTH (12bit/pixel) | OMISSION |

FIG. 7

| NO. | AVAILABLE INTERPOLATION DATA | IMAGE FORMAT AFTER APPLICATION | SCORE (POINT) |
|---|---|---|---|
| 1 | RESOLUTION (8k4k) | 8k4k, 60Hz, 8bit/pixel | OMISSION |
| 2 | FRAME RATE (120Hz) | 4k2k, 120Hz, 8bit/pixel | 2 |
| 3 | BIT DEPTH (10bit/pixel) | 4k2k, 60Hz, 10bit/pixel | 1 |
| 4 | BIT DEPTH (12bit/pixel) | 4k2k, 60Hz, 12bit/pixel | OMISSION |
| 5 | FRAME RATE (120Hz) + BIT DEPTH (10bit/pixel) | 4k2k, 120Hz, 10bit/pixel | 3 |
| 6 | FRAME RATE (120Hz) + BIT DEPTH (12bit/pixel) | 4k2k, 120Hz, 12bit/pixel | OMISSION |

FIG. 11

| NO. | SET NAME | INTERPOLATION DATA SELECTION INFORMATION | IMAGE-QUALITY ENHANCEMENT PROCESSING SELECTION INFORMATION |
|---|---|---|---|
| 1 | SPORTS | FRAME RATE (120Hz) | SUPER RESOLUTION |
| 2 | THEATER | RESOLUTION (8k4k) | FRAME RATE CONVERSION |
| 3 | OTHERS | RESOLUTION (8k4k) | FRAME RATE CONVERSION | ns
IMAGE PLAYBACK DEVICE, DISPLAY DEVICE, AND TRANSMISSION DEVICE

TECHNICAL FIELD

The present invention relates to a video playback device, a display device and a transmission device.

BACKGROUND ART

Japanese Unexamined Patent Application Publication No. 2013-174798 (Patent Literature 1) is known in the background art of the technical field. The publication provides a description of "a video playback device comprising additional-information separating means that separates additional information from an incoming video signal, and interpolation-video generating means that generates interpolation video from the video signal and the additional information, and a video playback method comprising the additional-information separating process of separating additional information from an incoming video signal, and the interpolation-video generating process of generating interpolation video from the video signal and the additional information."

CITATION LIST

Patent Literature

Patent Literature 1: Japanese Unexamined Patent Application Publication No. 2013-174798

SUMMARY OF THE INVENTION

Technical Problem

Patent Literature 1 discloses a technique for transmitting interpolation data as additional information in addition to a video signal from a transmission device in order to implement higher frame rate processing with high accuracy at a display device while reducing the amount of data transmitted. It can be thought that such techniques disclosed in patent Literature 1 are extended to cover the interpolation data for performing processing for higher resolution, higher bit depth and/or the like so that a video signal added with interpolation data of a plurality of kinds on image quality as additional information is transmitted from the transmission device to a display device in order to generate video with higher image quality.

However, because of a limitation on the capacity of a transmission line, such as HDMI (registered trademark) (High Definition Multimedia Interface), for data interchange between the transmission device and the display device, the transmitting of all interpolation data of a plurality of kinds to the display device is impractical.

The present invention has been made to solve such technical issues and it is an object of the present invention to generate display video with high image quality while taking into account the capacity of a transmission line between a transmission device transmitting video data and a display device causing a display unit to display video.

Solution to Problem

To solve the technical issues, the present invention includes an interpolation data selection unit that selects a kind of interpolation data to be transmitted to a display device, on the basis of priorities for a plurality of kinds of interpolation data capable of being generated based on encoded information.

Advantageous Effects of Invention

According to the present invention, display video can be generated with high image quality while taking into account the capacity of a transmission line between a transmission device transmitting video data and a display device causing a display unit to display video. The above and other problems, configurations and advantageous effects will be more apparent from a consideration of the subsequent description of embodiments.

BRIEF DESCRIPTION OF DRAWINGS

FIG. 4 is a diagram showing an example of available interpolation data information in accordance with the first embodiment.

FIG. 6 is a diagram illustrative of a table showing use priorities set for kind information in interpolation data of a single kind in accordance with the first embodiment.

FIG. 7 is a diagram illustrative of a table in which score information is added to available interpolation data information transmitted from the transmission device, based on the priorities table, in accordance with the first embodiment.

FIG. 11 is a table illustrative of a combination of interpolation data and image-quality enhancement processing in accordance with the second embodiment.

DESCRIPTION OF EMBODIMENTS

Embodiments will now be described with reference to the accompanying drawings.

First Embodiment

Figure 1:
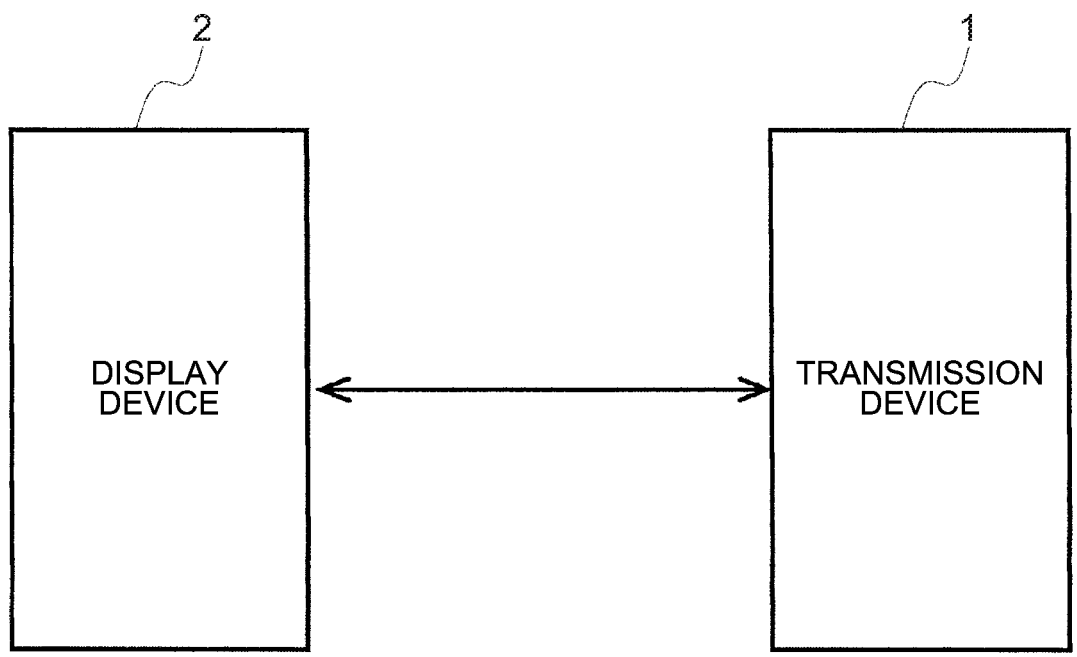
FIG. 1 is a block diagram showing the configuration of an image display system in accordance with a first embodiment.

FIG. 1 is a block diagram showing the configuration of an image display system in accordance with a first embodiment. As shown in FIG. 1, in the image display system in the first embodiment, a transmission device 1 and a display device 2 communicates for information exchange with each other over a transmission line such as HDMI (registered trademark) (High Definition Multimedia Interface).

The transmission device 1 is, for example, a set-top box, which receives data delivered from a broadcast station and/or the like, and then converts the received data into video data to be capable of being displayed at the display device 2 (hereinafter referred to as the "image data") for transmission to the display device 2. The display device 2 is, for example, a display monitor, which generates display images (video) on the basis of the image data transmitted from the transmission device 1.

That is, the image display system according to the first embodiment is a video playback device that reproduces video by transmitting data received by a transmission device as image data to a display device and then displaying display-images generated from the image data received by the display device.

Figure 2:
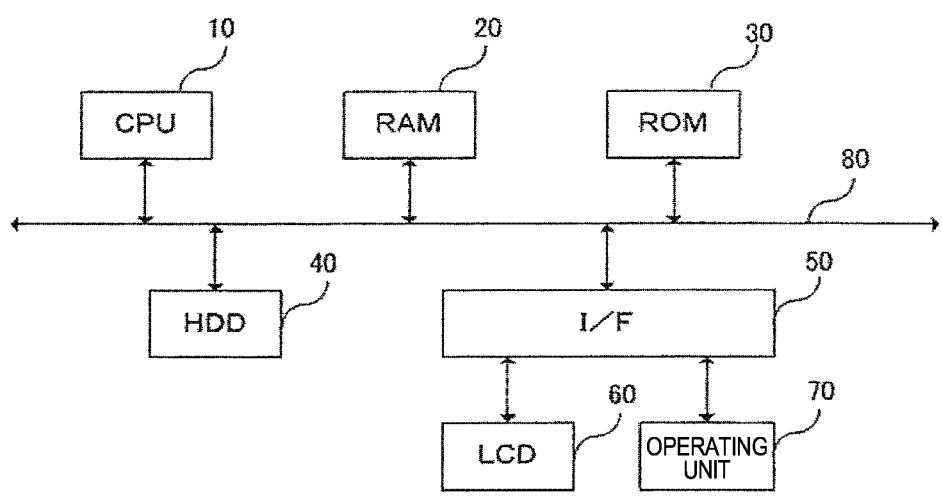
FIG. 2 is a block diagram showing the hardware configuration of a transmission device and a display device in accordance with the first embodiment.

The hardware configuration of the transmission device 1 and the display device 2 according to the first embodiment will now be described. FIG. 2 is a block diagram showing the hardware configuration of the transmission device 1 and the display device 2 according to the first embodiment. As shown in FIG. 2, the transmission device 1 and the display device 2 according to the first embodiment include configuration similar to common servers, PCs (Personal Computers) and the like. The following description is given of the hardware configuration of the transmission device 1 by way of example, and a similar description applies to the display device 2.

Specifically, the transmission device 1 according to the first embodiment includes a CPU (Central Processing Unit) 10, RAM (Random Access Memory) 20, ROM (Read Only Memory) 30, HDD (Hard Disk Drive) 40 and an I/F 50 that are connected to each other via a bus 80. The I/F 50 is also connected to an LCD (Liquid Crystal Display) 60 and an operating unit 70. In addition, an engine is included for performing various functions.

The CPU 10 is computing means, which controls the operation of the entire transmission device 1. The RAM 20 is a volatile storage medium from/to which information can be read/written at high speeds, which is used as workspace when the CPU 10 executes information processing. The ROM 30 is a nonvolatile read-only storage medium, which has programs, such as firmware and/or the like, stored therein. The HDD 40 is a nonvolatile storage medium from/to which information can be read/written, which has OS (Operating System), various control programs, application programs and/or the like stored therein.

The I/F 50 connects and controls the bus 80 to a variety of hardware, a network and/or the like. The LCD 60 is a visual user interface to allow the user to check the transmission device 1 for condition. The operating unit 70 is a user interface to allow the user to enter information to the transmission device 1, such as a key board, a mouse and/or the like. Not that, if the transmission device 1 in the first embodiment is equipment such as a set-top box or the like as described in FIG. 1, the user interfaces such as the LCD 60, the operating unit 70 and/or the like can be omitted.

In such a hardware configuration, a program stored in the ROM 30, the HDD 40 or a storage medium not shown such as an optical disc or the like is read to the RAM 20 to operate under control of the CPU 10, thus configuring a software control unit. The software control unit configured in this manner is combined with the hardware to form a functional block implementing the functions of the transmission device 1 and the display device 20 according to the first embodiment.

Figure 3:
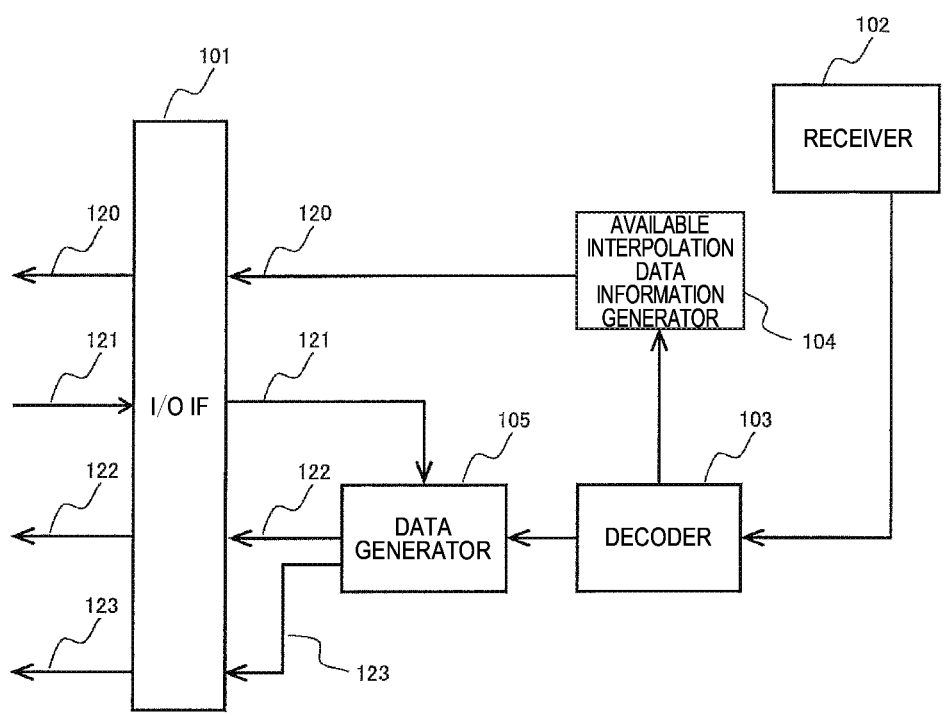
FIG. 3 is a block diagram illustrative of functional configuration of the transmission device in accordance with the first embodiment.

The functional configuration of the transmission device 1 according to the first embodiment will now be described. FIG. 3 is a block diagram illustrating the functional configuration of the transmission device 1 in the first embodiment. As shown in FIG. 3, the transmission device 1 in the first embodiment includes an I/O IF 101, receiver 102, decoder 103, available interpolation data information generator 104 and a data generator 105.

The I/O IF 101 is an interface for exchanges of information with the display device 2, which is, for example, an I/O terminal of HDMI. The receiver 102 receives data delivered from a broadcast station or the like and outputs to the decoder 103 a data stream which is encoded information including image information.

The decoder 103 decodes the data stream input from the receiver 102 to produce decoded image data which is decoded information. The decoder 103 outputs format information which is information on image qualities of the decoded image data thus produced, such as resolutions, frame rates, bit depths and/or the like, (hereinafter referred to as the "source image format information") to an available interpolation data information generator 104. The decoder 103 also outputs the decoded image data produced to a data generator 105.

Based on the source image format information input from the decoder 103 and base image format information, the available interpolation data information generator 104 generates available interpolation data information 120 and transmits it to the display device 2 via the I/O IF 101. The base image format information is format information on predetermined formats (resolutions, frame rates, bit depths and/or the like) of image data transmitted from the transmission device 1 to the display device 2, which is preset and stored in a storage medium or the like, not shown.

FIG. 4 is a table showing an example of the available interpolation data information 120. As shown in FIG. 4, the available interpolation data information 120 has a table structure with "available interpolation data" and "image format after application" being associated with each other. The "available interpolation data" represents available kinds of interpolation data, and the "image format after application" represents image format information to be generated at an image generator 203 of the display device 2, which will be described later, when the associated "available interpolation data" is used.

For example, if the source image format information has a "8k4k" resolution, a "120 Hz" frame rate, and "12 bits" of bit depth, and the base image format information has a "4k2k" resolution, a "60 Hz" frame rate and "8 bits" of bit depth, interpolation data is capable of being generated to convert the image data from image quality indicated by the base image format information to image quality indicated by the source image format information.

As for the case of the source image format information and the base image format information described above, therefore, the available interpolation data information generator 104 generates, for example, the "available interpolation data" and the "image format after application" shown in FIG. 4. For example, the "resolution (8k4k)" in the "available interpolation data" is a kind of interpolation data for conversion of resolution in image data to 8k4k. The interpolation data is generated from the source image data (decoded image data) having a "8k4k" resolution and the base image data having a "4k2k" resolution.

Further, for example, phrase "frame rate (120 Hz)+bit depth (10 bits/pixels)" means a combination of the interpolation data for conversion of the frame rate in the image data to 120 Hz and the interpolation data for conversion of the bit depth in the image data to 10 bits/pixels. These pieces of interpolation data are generated from the source image data and the base image data as in the case of the interpolation data for resolution conversion.

It should be noted that enabling/disabling of such a combination of a plurality of kinds of interpolation data is determined depending on the capacity of the transmission line such as HDMI or the like connecting the transmission device 1 and the display device 2 shown in FIG. 1 to each other. For example, a combination of "resolution (8k4k)+frame rate (120 Hz)+bit depth (10 bits/pixels)" is incapable of being transmitted due to capacity limits of the transmission line, so that this combination is not included in the "available interpolation data" in the available interpolation data information 120 shown in FIG. 4. With consideration given to the capacity of the transmission line as described above, as illustrated in Nos. 5 and 6 in FIG. 4, the interpolation data of a combination of a plurality of kinds (illustrated here as frame rate and bit depth) is made available, thus making full use of a transmission line to make it possible to generate display images with high quality.

Then, for example, when a base image of the aforementioned base image format is converted using the interpolation data (No. 1) having a "resolution (8k4k)", image data to be generated has a resolution converted from "4k2k" to "8k4k", and a frame rate and a bit depth which are "60 Hz" and "8 bits/pixels" remaining the same as defined by the base image format. Thus, the "image format after application" associated with the "resolution (8k4k)" results in "8k4k, 60 Hz, 8 bits/pixels".

It should be noted that the available interpolation data information generator 104 may generate a plurality of pieces of "available interpolation data" with hierarchical structure within the range of values (e.g., bit depth) indicated respectively by the source image format information and the base image format information, in regard to the same kind (here assumed as bit depth) as illustrated in Nos. 3, 4 in FIG. 4. This makes it possible to select appropriate interpolate data in accordance with the display performance and display settings of the display device 2.

Specifically, the available interpolation data information 120 is interpolation data list information describing a list of a plurality of kinds of interpolation data that are capable of being generated based on the encoded information (data stream). The available interpolation data information generator 104 functions as an interpolation data list information generator to generate interpolation data list information.

The data generator 105 acquires interpolation data selection information 121, which will be described later, transmitted from the display device 2, via the I/O IF 101. The data generator 105 generates image data 122 and interpolation data 123 from the decoded image data input from the decoder 103, on the basis of the acquired interpolation data selection information 121 and the base image format information pre-stored in a storage medium or the like. Specifically, the data generator 105 generates the image data 122 by converting the pixel value of the decoded image data such that the image quality of the decoded image data becomes equal to the image quality of the base image format.

From the decoded image data having the image quality indicated by the source image format information and the image data 122 having the image quality indicated by the base image format information, the data generator 105 also generates interpolation data 123 for causing the generated image data 122 to have an image quality pertaining to a kind of the interpolation data indicated by the interpolation data selection information 121. It should be noted that the data generator 105 may be configured to generate the interpolation data 123 in the course of the conversion processing for pixel values when the image data 122 is generated as described above.

The data generator 105 also transmits the image data 122 and the interpolation data 123 which have been generated to the display device 2 via the I/O IF 101. More specifically, the data generator 105 functions as a data transmission unit to transmit, to the display device, the image data 122 generated in a predetermined format (base image format information) based on the information decoded from the encoded information (data stream) (decoded image data) and the interpolation data 123 for interpolating differences between the predetermined format (base image format information) and a format when the encoded information is decoded (format information of source image data).

Here, if the data stream has a hierarchical structure such as SVC (Scalable Video Coding) specified by H.264 (ITU-T Rec. H.264|ISO/IEC 14496-10 Advanced Video Coding) or the like, the data stored in an extended hierarchy of the data stream may be transmitted as the interpolation data 123 without being processed. In this manner, the use of data in the original data stream as the interpolation data 123 without processing can reduce the details of the processing performed at the data generator 105 and lower the power consumption and the circuitry size.

It is noted that, although the first embodiment is described on the assumption that the transmission device 1 is a set-top box, the transmission device 1 may be another device such as a recorder, PC or the like. Assuming that the transmission device 1 is a recorder, instead of receiving data through the receiver 102 from a broadcast station, reading the image data stored on a hard disc or the like makes it possible to implement a similar configuration for the accumulated data to the above-described configuration.

Figure 5:
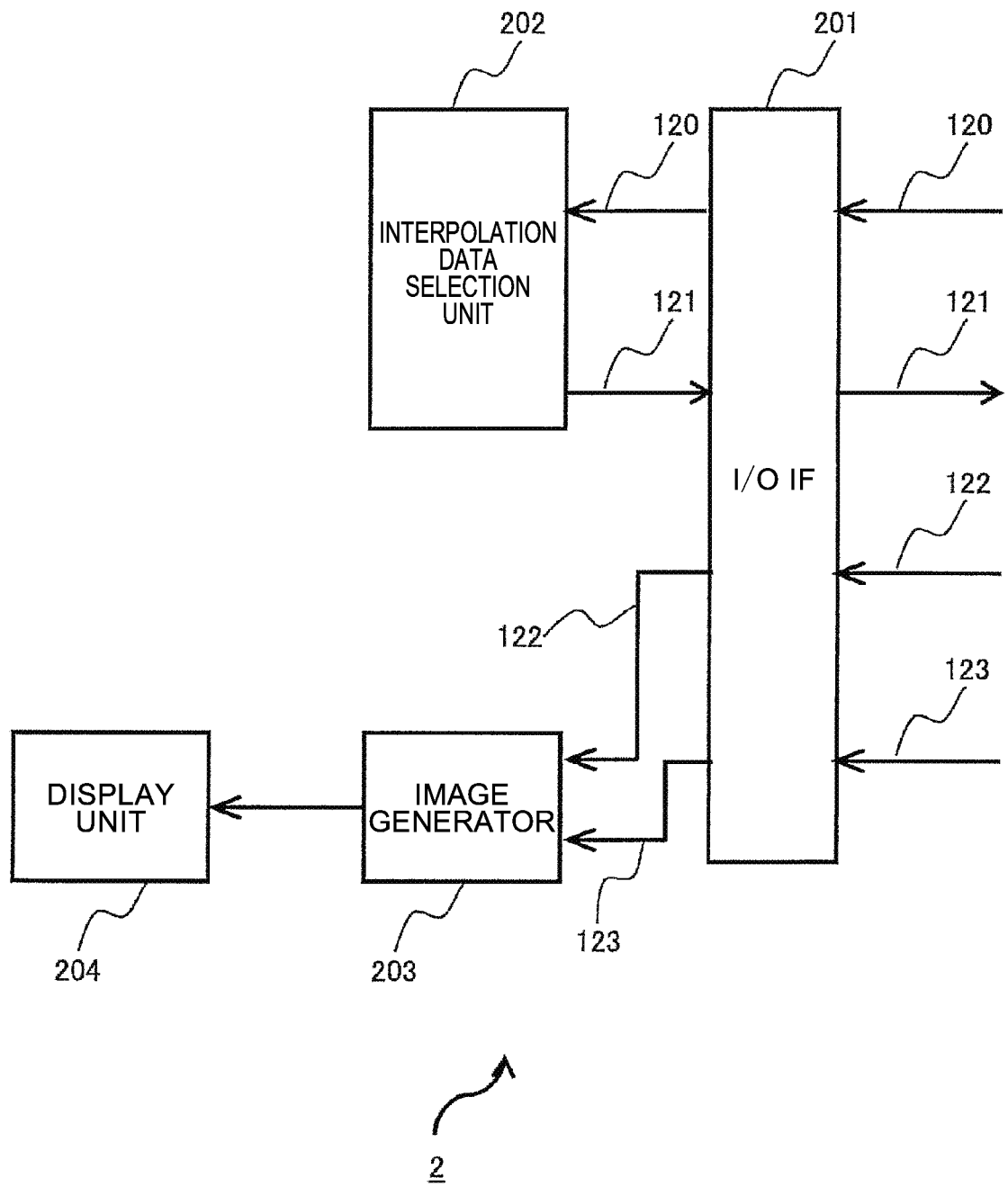
FIG. 5 is a block diagram illustrative of functional configuration of the display device in accordance with the first embodiment.

The functional configuration of the display device 2 in accordance with the first embodiment will now be described. FIG. 5 is a block diagram illustrative of the functional configuration of the display device 2 in accordance with the first embodiment. As shown in FIG. 5, the display device 2 includes an I/O IF 201, interpolation data selection unit 202, image generator 203 and a display unit 204.

The I/O IF 201 is an interface for exchanges of data and/or information with the transmission device 1, which is, for example, an I/O terminal of HDMI. The interpolation data selection unit 202 acquires the available interpolation data information 120 transmitted from the transmission device 1 through the I/O IF 201, and selects a kind of the interpolation data for utilization from the acquired available interpolation data information 120. The interpolation data selection unit 202 also outputs the interpolation data selection information 121 indicating the selected kind of the interpolation data to the transmission device 1 via the I/O IF 201. The processing of selecting the interpolation data by the interpolation data selection unit 202 will be described later in detail.

The image generator 203 acquires the image data 122 and the interpolation data 123 which are transmitted from the transmission device 1 through the I/O IF 201, and uses the acquired interpolation data 123 to perform, on the image data 122, the image-quality enhancement processing which meets the kind of the interpolation data 123 to increase the frame rate, the resolution, the bit depth and/or the like in order to generate display image data which is then output to the display unit 204. The display unit 204 is, for example, a liquid crystal panel for display of the display image data generated by the image generator 203. In other words, the image generator 203 functions as a display processing unit to cause the display unit 204 to display an image interposed based on the acquired image data 122 (video data) and the interpolation data.

Interpolation data selection processing by the interpolation data selection unit 202 will now be described in detail. The description is given of a display device 2 having display performance with a 4k2k image-size, a 120 Hz frame rate and 10 bits of a bit depth, by way of example. The interpolation data selection unit 202 acquires kind information in the interpolation data of a single kind, such as "resolution (8k4k)" or "frame rate (120 Hz)" shown in FIG. 4 or the like, out of the available interpolation data information 120 transmitted from the transmission device 1.

The interpolation data selection unit 202 exempts, from the available range, unusable kind information in the interpolation data in terms of the display performance of the display device 2 out of all the kind information in the acquired interpolation data of a single kind. For example, because the display device 2 has display performance with a 4k2k image size, even if the "resolution (8k4k)" shown in FIG. 4 is used, an image generated by interpolation is incapable of being displayed on the display device 2, so that the "resolution (8k4k)" is omitted.

The interpolation data selection unit 202 assigns use priorities to the kind information in the interpolation data to be used out of the remainder of the kind information in the interpolation data of single kind. FIG. 6 is a diagram illustrative of a table of use priorities set for kind information in the interpolation data of single kind. As shown in FIG. 6, for example, the use priorities are shown in a box of "allocation point", and the higher point indicates the higher use priority.

In the instance shown in FIG. 6, because the kind information in the interpolation data indicating a "resolution (8k4k)" and a "bit depth (12 bits/pixels)" is withdrawn, the "allocation point" is determined as "omission". Further, the "allocation point" for the "frame rate (120 Hz)" is determined as "two" and the "allocation point" for the "bit depth (10 bits/pixels)" is determined as "one", so that the use of the interpolation data on the "frame rate (120 Hz)" is given a higher priority.

It is noted that such priorities are preset for each display device 2, for example, a default setting value. Instead, the priorities may be determined by an administrator or the like of the display device 2 entering information specifying priorities.

FIG. 7 is a diagram illustrative of a table in which score information is added to the available interpolation data information 120 transmitted from the transmission device 1, based on the priorities table illustrated in FIG. 6. As shown in FIG. 7, a "score" is added to each piece of the "available interpolation data" in the available interpolation data information 120. The "score" represents the result of adding the allocation point in the respective elements shown in FIG. 6. For example, the score of the "frame rate (120 Hz)+bit depth (10 bits/pixels)" in box No. 5 is "three" obtained by adding together the allocation point "two" for the "frame rate (120 Hz)" and the allocation point "one" for the "bit depth (10 bits/pixels)" shown in FIG. 6. Also, the "score" of the "available interpolation data" including any of the elements determined as "omission" in the table shown in FIG. 6 is "omission", which is left out of the selection range.

The interpolation data selection unit 202 selects the highest scoring "available interpolation data" (No. 5 in the table shown in FIG. 7) from the table shown in FIG. 7.

Figure 8:
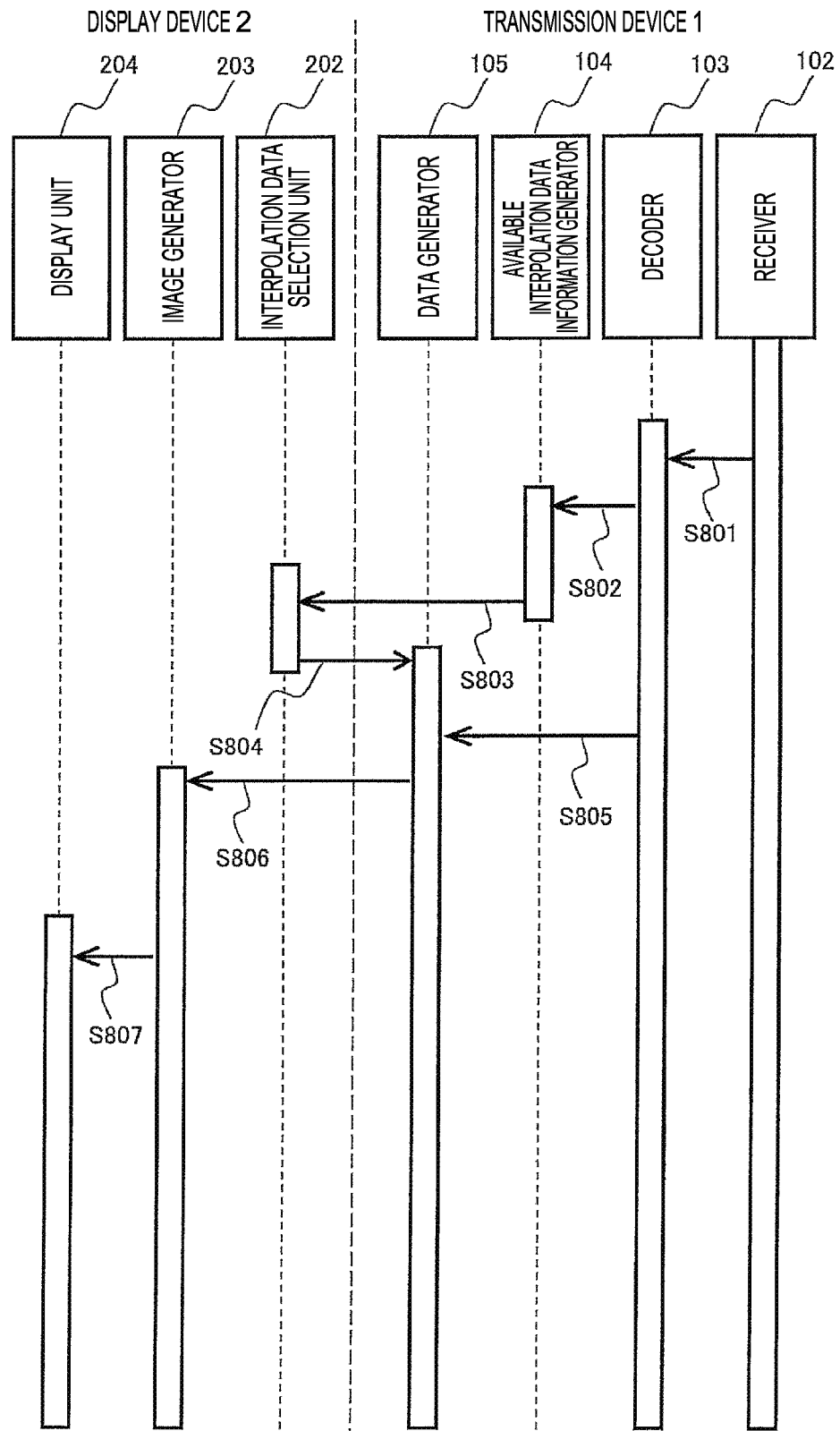
FIG. 8 is a sequence diagram illustrative of the operation of the image display system in accordance with the first embodiment.

The operation of the image display system in the first embodiment will now be described. FIG. 8 is a sequence diagram illustrative of the operation of the image display system in the first embodiment. The arrows in FIG. 8 indicate flows of data between the transmission device 1 and the display device 2 in the image display system in accordance with the first embodiment.

As shown in FIG. 8, the receiver 102 of the transmission device 1 outputs a data stream to the decoder 103 (S801). The decoder 103 acquiring the data stream from the receiver 102 outputs source image format information to the available interpolation data information generator 104 (S802). The available interpolation data information generator 104 acquiring the source image format information from the decoder 103 generates and outputs available interpolation data information 120 to the interpolation data selection unit 202 of the display device 2 (S803).

The interpolation data selection unit 202 acquiring the available interpolation data information 120 from the available interpolation data information generator 104 of the transmission device 1 selects interpolation data of a kind to be used from "available interpolation data" included in the available interpolation data information 120, and outputs interpolation data selection information 121 to the data generator 105 of the transmission device 1 (S804).

The decoder 103 of the transmission device 1 also outputs decoded image data to the data generator 105 (S805). It should be noted that the processes in S803 and S804 and the process in S805 are not subject to the constraint of a sequence order, and may be performed in inverse order or in parallel.

The data generator 105 acquiring the interpolation data selection information 121 output from the interpolation data selection unit 202 of the display device 2 and the decoded image data output from the decoder 103 generates image data 122 and interpolation data 123 based on the acquired interpolation data selection information 121 and decoded image data, and outputs them to the image generator 203 of the display device 2 (S806).

The image generator 203 acquiring the image data 122 and the interpolation data 123 from the data generator 105 of the transmission device 1 uses the acquired image data 122 and interpolation data 123 to generate and output display image data to the display unit 204 (S807).

As described above, in the image display system according to the first embodiment, in the transmission device 1, based on the priorities for a plurality of kinds of interpolation data capable of being generated, interpolation data for use in enhancing image quality is selected from the plurality of kinds of the interpolation data. The display device 2 acquires the selected interpolation data and the image data to be displayed and uses the acquired interpolation data to generate a display image from the image data with enhanced image quality. As a result, in the transmission device 1, instead of all the plurality of kinds of the interpolation data capable of being generated, only the interpolation data having higher use priority in relation to the display device 2 is transmitted to the display device 2. This makes it possible to generate a display image with high image quality while taking the capacity of the transmission line between the transmission device 1 and the display device 2 into account.

It is noted that the case of the available interpolation data information generator 104 generating the available interpolation data information 120 with consideration given to the capacity of the transmission line between the transmission device 1 and the display device 2 has been described by way of example in the first embodiment. Instead, in the available interpolation data information generator 104, without consideration given to the capacity of the transmission line, the available interpolation data information 120 including all the generable kinds of available interpolation data may be generated and output to the display device 2.

In this case, the interpolation data selection unit 202 selects available interpolation data with consideration given to the capacity of the transmission line. Specifically, as described in the first embodiment, the interpolation data selection unit 202 selects the "available interpolation data" having the highest score from the table shown in FIG. 7, and it is determined whether or not the selected "available interpolation data" is usable in terms of a capacity limit for the transmission line. If it is determined to be unusable, the interpolation data selection unit 202 selects the "available interpolation data" having the second highest score. The same processing is repeated until a selection is determined to be usable. The interpolation data selection unit 202 selects the "available interpolation data" determined as being usable.

Second Embodiment

A second embodiment will now be described. In the first embodiment, the interpolation data is selected based on the predetermined use priorities for interpolation data. In the second embodiment, the use priorities are set with reference to a category of the image data to be displayed and setting information on display mode to select interpolation data. For reference sake, the configuration of an image display system in accordance with the second embodiment is the same as or similar to the configuration of the display image system in accordance with the first embodiment shown in FIG. 1. The hardware configurations of the transmission device 1 and the display device 2 in the second embodiment are the same as or similar to the hardware configurations in the first embodiment shown in FIG. 2.

Figure 9:
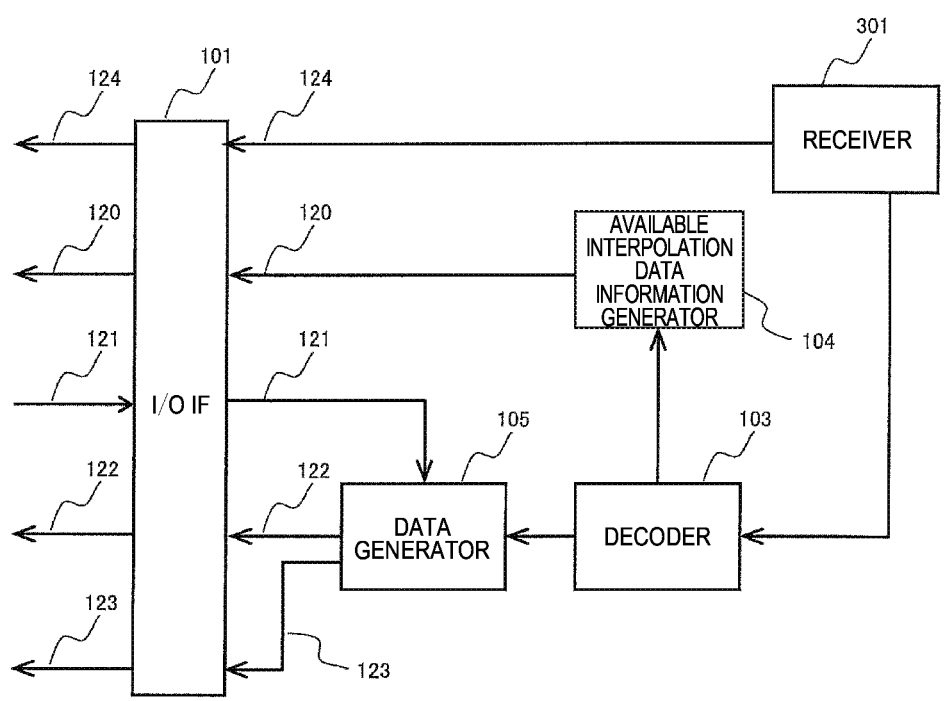
FIG. 9 is a block diagram illustrative of the functional configuration of a transmission device in accordance with a second embodiment.

FIG. 9 is a block diagram illustrating the functional configuration of the transmission device 1 in accordance with a second embodiment. As shown in FIG. 9, the transmission device 1 in the second embodiment is configured to include a receiver 301 substituted for the receiver 102 included in the functional configuration of the transmission device 1 in the first embodiment shown in FIG. 3. The following describes the receiver 301 which is different from each component shown in FIG. 3, and a discussion of the other components is omitted.

Similarly to the receiver 102 according to the first embodiment, the receiver 301 receives data delivered from a broadcast station or the like, and outputs the data stream including image information to the decoder 103. The receiver 301 also outputs genre information 124 on the data delivered from the broadcast station, to the display device 2 via the I/O IF 101.

The genre information 124 represents, for example, the contents ("sports", "movie/film" and/or the like) of data delivered from a broadcast station or the like, including, for example, a genre code in EPG (Electronic Program Guide) data delivered accompanying the image data from the broadcast station or the like. If the transmission device 1 is a recorder, when the imaged data is recorded on a hard disk or the like, the recording of the image contends as metadata together with the image data makes the same configuration implementable. The following describes an example that uses EPG genre codes as the genre information 124.

Figure 10:
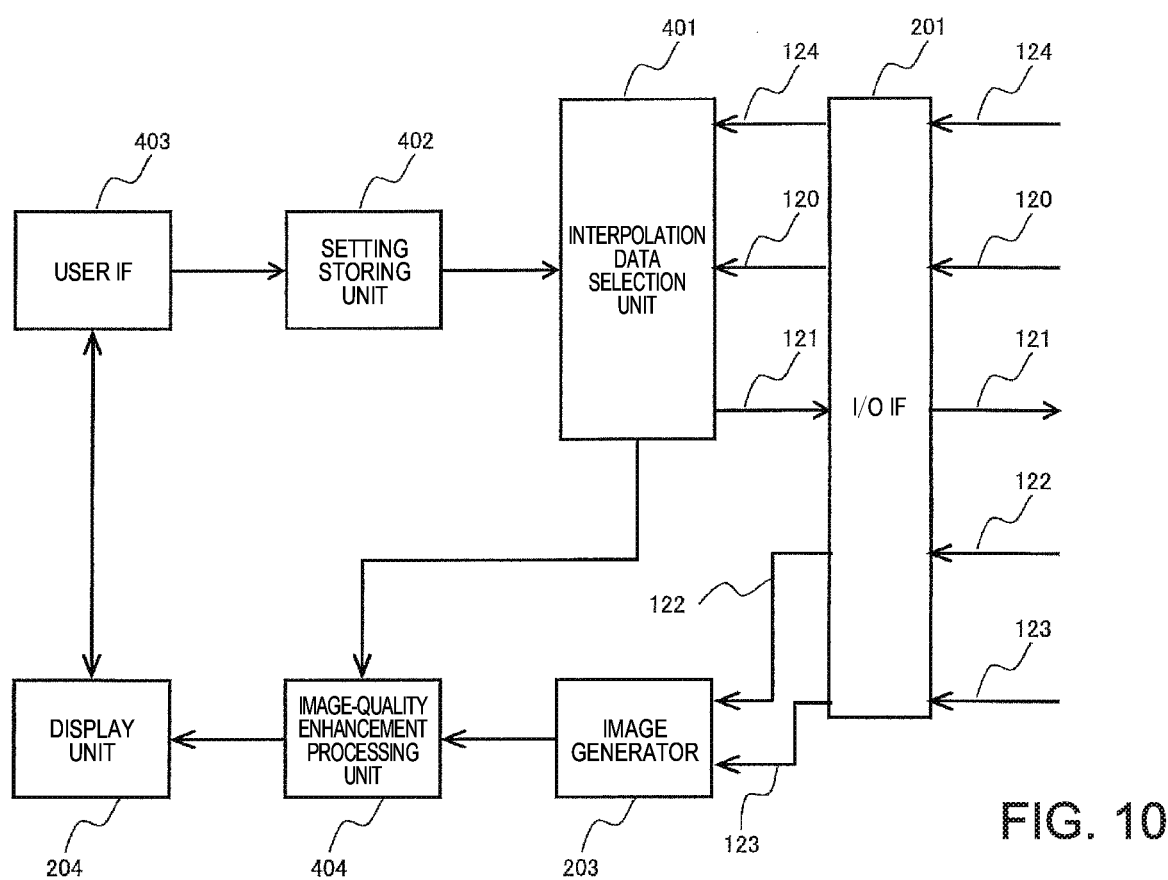
FIG. 10 is a block diagram illustrative of the functional configuration of a display device in accordance with the second embodiment.

FIG. 10 is a block diagram illustrative of the functional configuration of the display device 2 in accordance with the second embodiment. As shown in FIG. 10, the display device 2 in the second embodiment is configured to have an interpolation data selection unit 401 substituted for the interpolation data selection unit 202 included in the functional configuration of the display device 2 in the first embodiment shown in FIG. 5, and also to include additionally a setting storing unit 402, a user IF 403 and a image-quality enhancement processing unit 404. The following describes only components different from the respective components shown in FIG. 5, and a discussion of the other components is omitted.

The interpolation data selection unit 401 acquires the available interpolation data information 120 and the genre information 124 transmitted from the transmission device 1 via the I/O IF 201, and image-quality setting information stored in the setting storing unit 402 which will be described later. Based on the acquired genre information 124 and the image-quality setting information, the interpolation data selection unit 401 also selects a kind of the image-quality enhancement processing and a kind of the interpolation data for use from among the acquired available interpolation data information 120.

Details of the image-quality enhancement processing will be given when the image-quality enhancement processing unit 404 will be described later. Processing of selecting a kind of the image-quality enhancement processing and a kind of the interpolation data by the interpolation data selection unit 401 will also be discussed later.

The interpolation data selection unit 401 also outputs the interpolation data selection information 121 indicating the selected kind of the interpolation data to the transmission device 1 via the I/O IF 201. The interpolation data selection unit 401 also outputs the image-quality enhancement processing selection information indicating the selected kind of image-quality enhancement processing to the image-quality enhancement processing unit 404.

The setting storing unit 402 is a storage medium that stores image-quality setting information entered by the user through the later-mentioned user IF 403. The image-quality setting information indicates any of mode settings such as "living-room" mode, "theater" mode, "sports" mode, "game" mode, and the like, and, in response to the setting, a way of signal processing in the display device 2 is changed pursuant to a pre-stored algorithm. For example, the "theater" mode is set when a movie program or the like for which reproduction of fine pattern is desired is watched, and, based on this setting, signal processing is performed on the image data to place importance on reproducing of fine pattern.

It is noted that the image-quality setting information may include settings for direct control on a way of signal processing set by the user through the user IF 403, such as "contrast", "brightness", "noise reduction function ON/OFF" and/or the like.

The user IF 403 is an interface for displaying GUI (Graphical User Interface) on the display unit 204 to implement optional image-quality setting made by the user operating a remote controller or the like. The image-quality setting information entered by the user is outputted to the setting storing unit 402 through the user IF 403.

The image-quality enhancement processing unit 404 generates higher-quality image data by performing the image-quality enhancement processing in accordance with the image-quality enhancement processing selection information input from the interpolation data selection unit 401, on the display image data input from the image generator 203, and then outputs the higher-quality image data to the display unit 204. The image-quality enhancement processing is the function of enhancing image quality for the image data 122 in an abbreviated manner, which is inadequate to use the interpolation data 123 to enhance image quality for image data. This image-quality enhancement processing is a function owned independently by each of the display devices 2. In the second embodiment, the image-quality enhancement processing unit 404 is assumed to provide super resolution in which the processing for enhancing resolution is performed on image data, and frame rate conversion in which the processing for increasing the frame rate is performed on image data.

Even if an enhancement of image quality using the interpolation data 123 is not achieved or an enhancement of image quality only using some of the kinds of the interpolation data is achieved, the processing by the image-quality enhancement processing unit 404 enables an enhancement of image quality for image data to approach the display performance of the display device 2.

The selection processing for the interpolation data selection information 121 and the image-quality enhancement processing selection information performed by the interpolation data selection unit 401 will now be described in detail. It is noted that the description is given on the assumption that the image-quality enhancement processing capable being performed by the image-quality enhancement processing unit 404 has two kinds, frame rate conversion and super resolution.

Further, in the description, assuming that the source image format information has a "8k4k" resolution, a "120 Hz" frame rate, and "8 bits" of bit depth, and the base image format information has a "4k2k" resolution, a "60 Hz" frame rate and "8 bits" of bit depth, and also the display device 2 has display performance with a "8k4k" resolution, a "120 Hz" frame rate and "8 bits" of a bit depth. In short, in the description, because the source image format information and the base image format information are identical in bit depth, the interpolation data on "bit depth" is not included in the "available interpolation data" in the available interpolation data information 120.

FIG. 11 is a table illustrative of a combination of interpolation data and image-quality enhancement processing. The table shown in FIG. 11 is assumed to be generated by, for example, the interpolation data selection unit 401 on the basis of the acquired available interpolation data information 120, and to be stored in a storage medium, not shown, included in the display device 2, another device, a server or the like. The table illustrated in FIG. 11 is configured to make an association among "set name", "interpolation data selection information" and "image-quality enhancement processing selection information".

The "set name" is a name of mode set in the image-quality setting information and/or the genre information 124. The "interpolation data selection information" is a kind of interpolation data selected in the mode set by the "set name". The "image-quality enhancement processing selection information" is information on the image-quality enhancement processing selected in the mode set by the "set name".

For example, when the "set name" is "sports", image data to be displayed in the display device 2 is a sports program involving vigorous motions, so that performing the processing of increasing frame rate with high accuracy is desired. For this purpose, as illustrated in FIG. 11, when the "set name" is "sports", the "interpolation data selection information" is set as "frame rate (120 Hz)" and the "image-quality enhancement processing selection information" is set as "super resolution". This is because, in the setting of "sports", the use priority for higher frame rate is required to be higher than those for other kinds so that the frame rate is set to be the kind of the interpolation data that effects an enhancement of image quality with higher accuracy than the image-quality enhancement processing performed by the image-quality enhancement processing unit 404. It should be noted that the "frame rate (120 Hz)" selected as the "interpolation data selection information" is one of the pieces of "available interpolation data" included in the available interpolation data information 120 output from the transmission device 1.

Further, for example, when the "set name" is "theater", image data to be displayed in the display device 2 is a movie program for which reproduction of fine pattern is desired, so that performing the processing of enhancing resolution with high accuracy is desired. For this purpose, as illustrated in FIG. 11, when the "set name" is "theater", the "interpolation data selection information" is set as "resolution (8k4k)" and the "image-quality enhancement processing selection information" is set as "frame rate conversion". This is because, in the setting of "theater", the priority for higher resolution is required to be higher than those for other kinds so that the resolution is set to be the kind of the interpolation data that effects an enhancement of image quality with higher accuracy than the image-quality enhancement processing performed by the image-quality enhancement processing unit 404. It should be noted that the "resolution (8k4k)" selected as the "interpolation data selection information" is one of the pieces of "available interpolation data" included in the available interpolation data information 120 output from the transmission device 1.

Further, when the "set name" is "others" referring to other than "sports" and "theater", for example, one providing relatively high accuracy of all of the image-quality enhancement processing capable of being performed by the image-quality enhancement processing unit 404 is set for "image-quality enhancement processing selection". For example, when the frame rate conversion of the image-quality enhancement processing performed by the image-quality enhancement processing unit 404 provides relatively higher accuracy than the super resolution, the "frame rate conversion" is set for the "image-quality enhancement processing selection information" and the "resolution (8k4k)" is set for the "interpolation data selection information". In this manner, the image-quality enhancement processing unit 404 performs the processing providing relatively high accuracy and the other processing is performed by the image generator 203 using the interpolation data, thus achieving an enhancement of image quality with high accuracy.

In this manner, in the second embodiment, the use priorities for the respective kinds of the interpolation data in the display device 2 are determined in accordance with the image-quality setting information and the genre information 124. In the second embodiment, also, the use priorities for the respective kinds of the interpolation data in the display device 2 are determined in accordance with the details of the processing in the image-quality enhancement processing unit 404, therefore it is possible to make the most of the performance of the image-quality enhancement processing unit 404 to generate a display image with high image quality.

It is noted that, although the "interpolation data selection information" in the table shown in FIG. 11 has been described by use of only the single kind of the interpolation data by way of example, when a combination of a plurality of kinds of the interpolation data described in the first embodiment shown in FIG. 4 is included in the "available interpolation data" in the available interpolation data information 120, the combination of the interpolation data including, for example, the "interpolation data selection information" shown in FIG. 11 may be set as the "interpolation data selection information".

Figure 12:
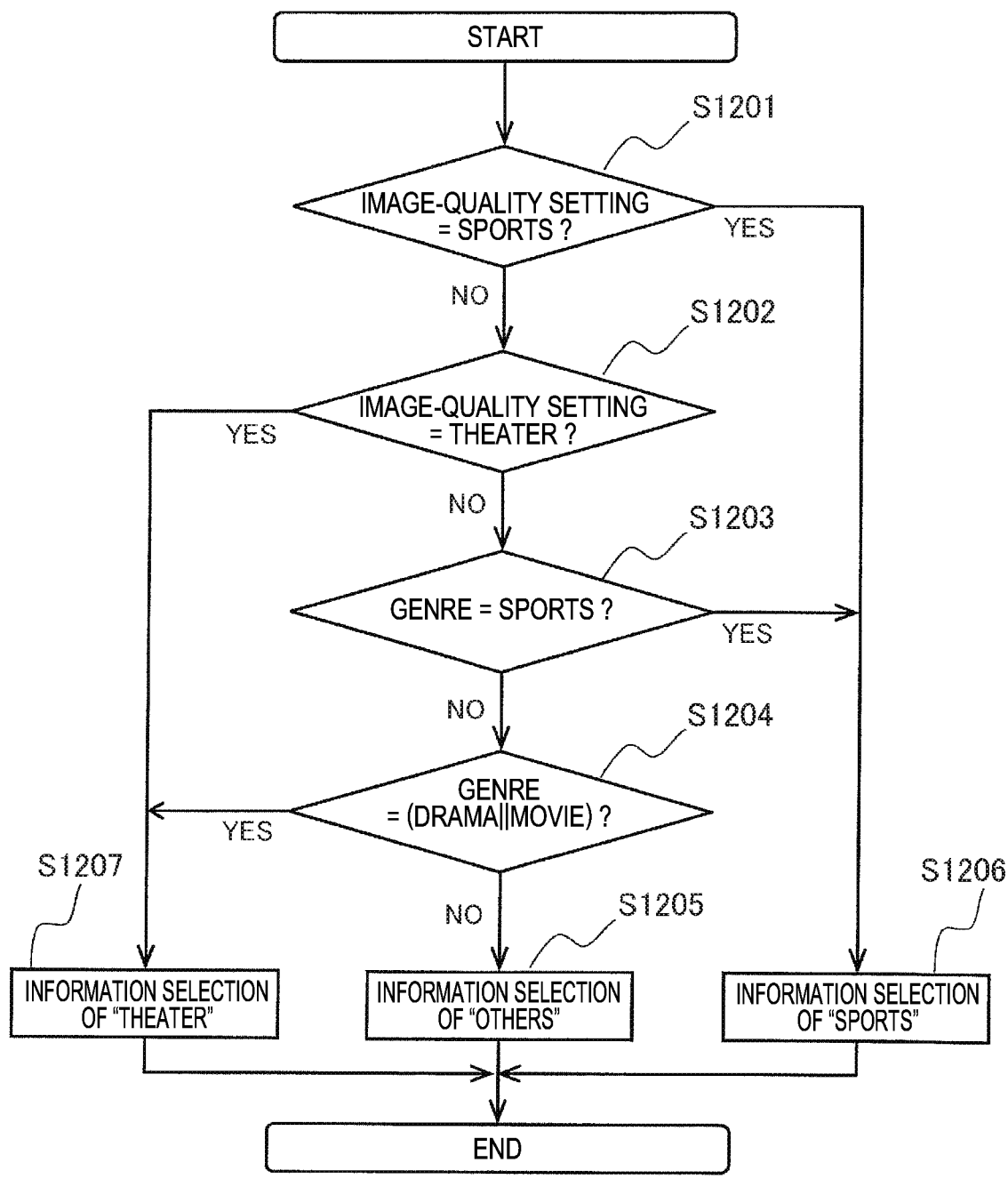
FIG. 12 is a flow chart illustrative of selection processing performed by an interpolation data selection unit on interpolation data selection information and image-quality enhancement processing selection information in accordance with the second embodiment.

FIG. 12 is a flow chart illustrative of the selection processing for the interpolation data selection information 121 and the image-quality enhancement processing selection information performed by the interpolation data selection unit 401. As shown in FIG. 12, the interpolation data selection unit 401 refers the image-quality setting information stored in the setting storing unit 402. If the image-quality setting is in "sports" mode (S1201/Yes), the interpolation data selection unit 401 selects "frame rate (120 Hz)" associated with the "sports" set name in the table shown in FIG. 11 as the interpolation data selection information 121, and "super resolution" as the image-quality enhancement processing selection information (S1206), and then terminates the processing.

On the other hand, if the image-quality setting is not in "sports" mode (S1201/NO) and is in "theater" mode (S1202/YES), the interpolation data selection unit 401 selects "resolution (8k4k)" associated with the "theater" set name in the table shown in FIG. 11 as the interpolation data selection information 121, and "super resolution" as the image-quality enhancement processing selection information (S1207), and then terminates the processing.

On the other hand, if the image-quality setting is in neither "sports" mode nor "theater" mode (S1201/NO, S1202/NO), the interpolation data selection unit 401 refers the genre information 124 (S1203). If the genre information 124 is "sports" (S1203/YES), the interpolation data selection unit 401 performs the above-described process in S1206, and then terminates the processing.

On the other hand, if the genre information 124 is not "sports" and is "drama" or "movie/film" (S1204/YES), the interpolation data selection unit 401 performs the above-described process in S1207, and then terminates the processing. On the other hand, if the genre information 124 is neither "sports" nor "drama" or "movie/film" (S1203/NO, S1204/NO), the interpolation data selection unit 401 selects "resolution (8k4k)" associated with the "others" set name in the table shown in FIG. 11 as the interpolation data selection information 121, and "super resolution" as the image-quality enhancement processing selection information (S1205), and then terminates the processing.

In this manner, selecting the interpolation data with taking the image-quality setting information into account enables display of images meeting the needs of the user. Further, the interpolation data is selected by giving a higher priority to the contents of the image-quality setting than the genre information 124 as described above. Thus, even when a plurality of pieces of information to be considered exists when the interpolation data is selected, the needs of the user can be incorporated preferentially. Further, selecting the interpolation data with taking the genre information 124 into account enables the interpolation data suitable for the contents of the image data transmitted from the transmission unit 1 to be used to generate and display a display image.

Figure 13:
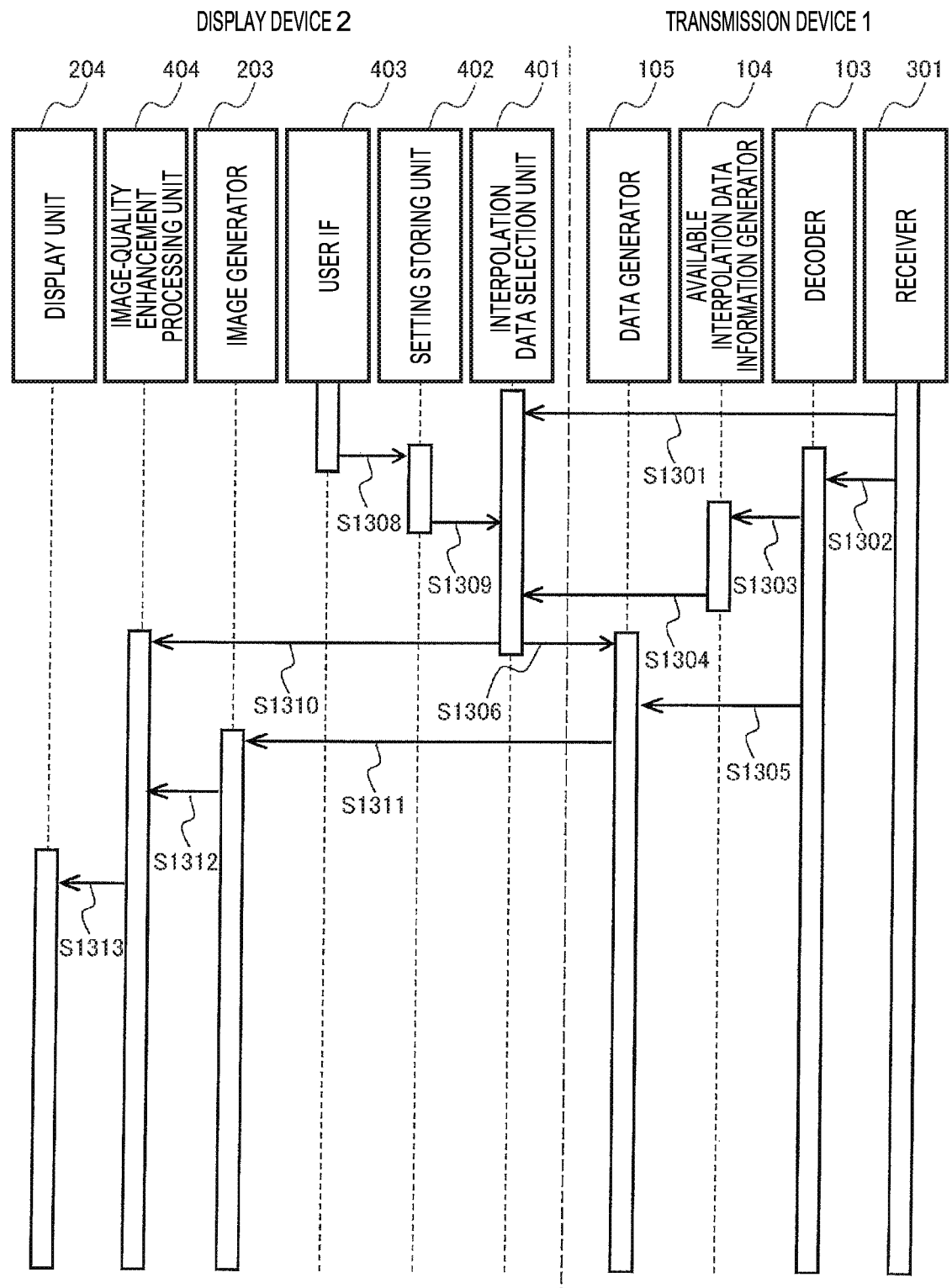
FIG. 13 is a sequence diagram illustrative of the operation of an image display system in accordance with the second embodiment.

The operation of the image display system in accordance with the second embodiment will now be described. FIG. 13 is a sequence diagram illustrative of the operation of the image display system in accordance with the second embodiment. Similarly to FIG. 8, the arrows in FIG. 13 indicate flows of data between the transmission device 1 and the display device 2 in the image display system in accordance with the second embodiment.

As shown in FIG. 13, the receiver 301 of the transmission device 1 outputs genre information 124 to the interpolation data selection unit 401 (S1301). The receiver 301 of the transmission device 1 also outputs a data stream to the decoder 103 (S1302). The decoder 103 acquiring the data stream from the receiver 301 outputs source image format information to the available interpolation data information generator 104 (S1303).

The available interpolation data information generator 104 acquiring the source image format information from the decoder 103 generates and outputs available interpolation data information 120 to the interpolation data selection unit 202 of the display device 2 (S1304). The user IF 403 of the display device 2 allows the setting storing unit 402 to store image-quality setting information entered by the user (S1308). The setting storing unit 402 storing the image-quality setting information outputs the stored image-quality setting information to the interpolation data selection unit 401 (S1309).

The interpolation data selection unit 401, which has obtained the genre information 124 output from the receiver 301 of the transmission device 1, the available interpolation data information 120 output from the available interpolation information generator 104 of the transmission device 1, and the image-quality setting information output from the setting storing unit 402, selects interpolation data selection information 121 and image-quality enhancement processing selection information based on the obtained data pieces. Then, the interpolation data selection unit 401 outputs the interpolation data selection information 121 to the data generator 105 of the transmission device 1 (S1306), and outputs the image-quality enhancement processing selection information to the image-quality enhancement processing unit 404 (S1310).

The decoder 103 of the transmission device 1 also outputs the decoded image data to the data generator 105 (S1305). The data generator 105, which has acquired the interpolation data selection information 121 output from the interpolation data selection unit 401 of the display device 2 and the decoded image data output from the decoder 103, generates image data 122 and interpolation data 123 based on the acquired interpolation data selection information 121 and the acquired decoded image data, and outputs them to the image generator 203 of the display device 2 (S1311).

The image generator 203, which has acquired the image data 122 and the interpolation data 123 from the data generator 105 of the transmission device 1, generates display image data using the acquired image data 122 and the acquired interpolation data 123 and outputs it to the image-quality enhancement processing unit 404 (S1312). The image-quality enhancement processing unit 404, which has acquired the image-quality enhancement processing selection information output from the interpolation data selection unit 401 and the display image data output from the image generator 203, performs image-quality enhancement processing of the acquired image-quality enhancement processing selection information on the acquired display image data, and outputs the enhanced-quality display image data to the display unit 204 (S1313).

It should be noted that the processes in S1301, the processes in from S1302 to S1304, and the processes in S1308 and S1309 are not subject to the constraint of a sequence order, and may be performed in inverse order or in parallel. Further, the process in S1306 and the process in S1305 are not subject to the constraint of a sequence order, and may be performed in inverse order or in parallel. Still further, the process in S1310 and the processes in S1311 and S1312 are not subject to the constraint of a sequence order, and may be performed in inverse order or in parallel.

If the user changes setting on image quality through the user IF 403 during image playback, the step S1308, step S1309, step S1306 and the step S1310 are performed anew in order, enabling operation reflecting the image-quality settings even in the middle of playback.

As described above, in the image display system according to the second embodiment, in the transmission device 1, the use priorities for a plurality of kinds of the interpolation data capable of being generated are determined in accordance with the genre information 124, the image-quality setting information and the details of the processing in the image-quality enhancement processing unit 404, and the interpolation data for use in enhancing image quality is selected from among the plurality of kinds of the interpolation data. The display device 2 acquires the selected interpolation data and the image data to be displayed and uses the acquired interpolation data to generate a display image from the enhanced-quality image data. In consequence, only the high use-priority interpolation data, which has been selected in relation to the display settings on the display device 2, the contents of the image data to be displayed, the functions provided by the display device 2, and the like, is transmitted to the display device 2. This makes it possible to generate a display image with high image quality while giving considerations to the capacity of the transmission line between the transmission device 1 and the display device 2.

It should be noted that, although the description in the second embodiment is given of, by way of example, the interpolation data selection unit 401 acquiring the interpolation data selection information and the image-quality enhancement processing selection information based on the genre information 124 and the image-quality setting information, it is not absolutely necessary for the interpolation data selection unit 401 to use both the genre information 124 and the image-quality setting information, and any one of both may be used. For example, when the image-quality setting information is not considered, the user IF 403 and the setting storing unit 402 are not absolutely necessary as components of the display device 2.

Further, the display device 2 in the second embodiment including the image-quality enhancement processing unit 404 has been described by way of example, but the configuration is not an absolute must. For example, if the display device 2 does not include the image-quality enhancement processing unit 404, the table shown in FIG. 11 includes only the "interpolation data selection information" associated with the "set name".

Further, in the first embodiment, a description has been given of, by way of example, the use priorities shown in FIG. 6 being set by default in accordance with the display device 2 or by an administrator or the like of the display device 2 entering information specifying priorities. In addition, when the image-quality enhancement processing unit 404 described in the second embodiment is included in the display device 2 in the first embodiment, the use priorities may be set in accordance with the details of the processing in the image-quality enhancement processing unit 404. Specifically, the use priorities is set based on, for example, presence/absence of various kinds of the image-quality enhancement processing (super resolution, frame rate conversion and the like) and performance.

For example, when the image-quality enhancement processing unit 404 applies super resolution, a higher use priority is assigned to the interpolation data for higher frame rate with which image quality cannot be enhanced in the image-quality enhancement processing unit 404 than one assigned to other kinds of the interpolation data.

Further, for example, when the image-quality enhancement processing unit 404 performs a plurality of the kinds of image-quality enhancement processing, a kind of the interpolation data used in the processing providing relatively high accuracy of all of the image-quality enhancement processing is assigned a lower use priority than the use priorities of the other kinds of the interpolation data. This is because, a kind of image-quality enhancement processing providing relatively high accuracy is performed by the image-quality enhancement processing unit 404 and the other kinds of image-quality enhancement processing are performed using the interpolation data by the image generator 203 so that the image-quality enhancement processing is able to be performed on the image data with higher accuracy.

Further, in the first and the second embodiment, a description has been given of, by way example, the display device 2 that selects a kind of the interpolation data for use is based on the use priorities from the available interpolation data information 120 transmitted from the transmission device 1, and transmits the interpolation data selection information to the transmission device 1, and acquires the selected interpolation data from the transmission device 1. In addition, the transmission device 1 may acquire situation information indicating the situations of the display device 2 such as display performance of the display device 2, image-quality setting, contents of image data to be displayed, details of the image-quality enhancement processing and/or the like, and select a kind of the interpolation data for use based on the use priorities determined in accordance with the acquired situation information. Further, the transmission device 1 may acquire the information on use priorities determined in the display device 2 and select a kind of the interpolation data for use based on the use priorities.

As described in the first and the second embodiment, in the configuration in which interpolation data is selected in the display device 2, the transmission device 1 is not required to perform the processing with consideration given to the use priorities determined for each display device 2. Therefore, the display device 2 can individually select the interpolation data based on its own algorithm, resulting in efficient configuration in terms of operation of the image display system. However, even in the configuration in which the interpolation data is selected in the transmission device 1, the interpolation data transmitted from the transmission device 1 to the display device 2 is only the selected interpolation data. Because of this, it is possible to generate high-quality display images while taking the capacity of the transmission line between the transmission device 1 and the display device 2 into account.

It will be understood that the present invention is not limited to the aforementioned embodiments, and various modifications can be made. For example, the aforementioned embodiments have been described in some detail for purposes of clarity of understanding the invention, and are not intended to be necessarily limited to one including all the above-described arrangements. Further, a portion of the configuration according to one embodiment may be substituted by the configuration in another embodiment, and the configuration according to one embodiment may be added to the configuration according to another embodiment. Further, for a portion of the configuration according to each embodiment, an addition, deletion and substitution of another configuration may be made.

REFERENCE SIGNS LIST

1 . . . Transmission device
2 . . . Display device
101 . . . I/O IF
102 . . . Receiver
103 . . . Decoder
104 . . . Available interpolation data information generator
105 . . . Data generator
120 . . . Available interpolation data information
121 . . . Interpolation data selection information
122 . . . Image data
123 . . . Interpolation data
124 . . . Genre information
201 . . . I/O IF
202 . . . Interpolation data selection unit
203 . . . Image generator
204 . . . Display unit
301 . . . Receiver
401 . . . Interpolation data selection unit
402 . . . Setting storing unit
403 . . . User IF
404 . . . Image-quality enhancement processing unit

The invention claimed is:

1. A video playback apparatus comprising:
a transmission apparatus configured to transmit video data; and
a display apparatus configured to receive the video data transmitted from the transmission apparatus via an interface and display an image based on the video data,
wherein the transmission apparatus comprises a first processor programmed to:
receive an encoded data stream,
generate decoded video data in a first format by decoding the encoded data stream,
generate list information of available interpolation data regarding a plurality of kinds of image quality for interpolating a difference between the decoded video data in the first format and video data in a second format being outputted to the display apparatus,
transmit the list information to the display apparatus,
receive selection information indicating a kind of interpolation data selected from the list information, from the display apparatus,
generate the video data in the second format and interpolation data from the decoded video data in the first format based on the received selection information, and
transmit the generated video data in the second format and the generated interpolation data to the display apparatus,
wherein the display apparatus comprises a second processor programmed to:
select one of the kinds of interpolation data from the list information of available interpolation data regarding the plurality of kinds of image quality received from the transmission apparatus,
transmit the selection information indicating the selected kind of interpolation data,
receive the video data in the second format and the interpolation data generated by the transmission apparatus from the transmission apparatus, and
display an image based on the received video data in the second format and the received interpolation data, wherein the second processor is further programmed to:
select the one of the kinds of interpolation data from the list information received from the transmission apparatus according to a predetermined priority order, and
set the predetermined priority order by excluding one or more of the kinds of interpolation data which are unusable in terms of display performance of the display apparatus from the list information.

2. The video playback apparatus according to claim 1, wherein the plurality of kinds of image quality includes resolution, frame rate and bit-depth.

3. The video playback apparatus according to claim 1,
wherein the second processor is further programmed to:
receive genre information of the video data from the transmission apparatus, and
set the predetermined priority order based on the received genre information.

4. The video playback apparatus according to claim 1,
wherein the display apparatus and the transmission apparatus are connected to communicate with each other via a HDMI line.

5. A transmission apparatus for transmitting video data in a selected format to a display apparatus comprising:
a receiver configured to receive an encoded data stream; and
a processor connected to the receiver,
wherein the processor is programmed to:
generate decoded video data in a first format by decoding the encoded data stream,
generate list information of available interpolation data regarding a plurality of kinds of image quality for interpolating a difference between the decoded video data in the first format and video data in a second format being transmitted to the display apparatus,
transmit the list information to the display apparatus,
receive selection information indicating a kind of interpolation data selected from the list information, from the display apparatus,
generate the video data in the second format and interpolation data from the decoded video data in the first format based on the received selection information, and
transmit the generated video data in the second format and the generated interpolation data to the display apparatus,
wherein one of the kinds of interpolation data is selected by the display apparatus from the list information received from the transmission apparatus according to a predetermined priority order, and
wherein the predetermined priority order is set by the display apparatus by excluding one or more of the kinds of interpolation data which are unusable in terms of display performance of the display apparatus from the list information.

6. The transmission apparatus according to claim 5, wherein the plurality of kinds of image quality includes resolution, frame rate and bit-depth.

7. The transmission apparatus according to claim 5,
wherein the processor is further programmed to:
transmit genre information of the video data to the display device apparatus, and
wherein the predetermined priority order is set by the display apparatus based on the genre information.

8. The transmission apparatus according to claim 5,
wherein the display apparatus and the transmission apparatus are connected to communicate with each other via a HDMI line.

9. A display apparatus for displaying an image based on video data transmitted from a transmission apparatus comprising:
  a display configured to display an image; and
  a processor connected to the display,
  wherein the processor is programmed to:
    receive list information of available interpolation data regarding a plurality of kinds of image quality for interpolating a difference between decoded video data in a first format generated by the transmission apparatus and video data in a second format being outputted to the display apparatus,
    select one of the kinds of interpolation data from the received list information,
    transmit selection information indicating the kind of interpolation data selected from the list information to the transmission apparatus,
    receive the video data in the second format and interpolation data generated by the transmission apparatus based on the selection information, from the transmission apparatus, and
    display an image on the display based on the received video data in the second format and the received interpolation data,
  wherein the processor is further programmed to:
    select the one of the kinds of interpolation data from the list information received from the transmission apparatus according to a predetermined priority order, and
    set the predetermined priority order by excluding one or more of the kinds of interpolation data which are unusable in terms of display performance of the display apparatus from the list information.

10. The display apparatus according to claim 9,
  wherein the processor is further programmed to:
    receive genre information of the video data from the transmission apparatus, and
    set the predetermined priority order based on the received genre information.

11. The display apparatus according to claim 9,
  wherein the display apparatus and the transmission apparatus are connected to communicate with each other via a HDMI line.

12. The display apparatus according to claim 9, wherein the plurality of kinds of image quality includes resolution, frame rate and bit-depth.

13. A video playback apparatus comprising:
  a transmission apparatus configured to transmit video data; and
  a display apparatus configured to receive the video data transmitted from the transmission apparatus via an interface and display an image based on the video data,
  wherein the transmission apparatus comprises a first processor programmed to:
    receive an encoded data stream,
    generate decoded video data in a first format by decoding the encoded data stream,
    generate list information of available interpolation data regarding a plurality of kinds of image quality for interpolating a difference between the decoded video data in the first format and video data in a second format being outputted to the display apparatus,
    transmit the list information to the display apparatus,
    receive selection information indicating a kind of interpolation data selected from the list information, from the display apparatus,
    generate the video data in the second format and interpolation data from the decoded video data in the first format based on the received selection information, and
    transmit the generated video data in the second format and the generated interpolation data to the display apparatus,
  wherein the display apparatus comprises a second processor programmed to:
    select one of the kinds of interpolation data from the list information of available interpolation data regarding the plurality of kinds of image quality received from the transmission apparatus,
    transmit the selection information indicating the selected kind of interpolation data,
    receive the video data in the second format and the interpolation data generated by the transmission apparatus from the transmission apparatus, and
    display an image based on the received video data in the second format and the received interpolation data,
  wherein the list information received from the transmission apparatus is generated by the transmission apparatus based on a capacity of a transmission line connected the transmission apparatus to the display apparatus.

14. The video playback apparatus according to claim 13,
  wherein the display apparatus and the transmission apparatus are connected to communicate with each other via a HDMI line.

15. The video playback apparatus according to claim 13, wherein the plurality of kinds of image quality includes resolution, frame rate and bit-depth.

16. A transmission apparatus for transmitting video data in a selected format to a display apparatus comprising:
  a receiver configured to receive an encoded data stream; and
  a processor connected to the receiver,
  wherein the processor is programmed to:
    generate decoded video data in a first format by decoding the encoded data stream,
    generate list information of available interpolation data regarding a plurality of kinds of image quality for interpolating a difference between the decoded video data in the first format and video data in a second format being transmitted to the display apparatus,
    transmit the list information to the display apparatus,
    receive selection information indicating a kind of interpolation data selected from the list information, from the display apparatus,
    generate the video data in the second format and interpolation data from the decoded video data in the first format based on the received selection information, and
    transmit the generated video data in the second format and the generated interpolation data to the display apparatus,
  wherein the list information transmitted to the display apparatus is generated by the transmission apparatus based on a capacity of a transmission line connected the transmission apparatus to the display apparatus.

17. The transmission apparatus according to claim 16,
  wherein the display apparatus and the transmission apparatus are connected to communicate with each other via a HDMI line.

18. The transmission apparatus according to claim 16, wherein the plurality of kinds of image quality includes resolution, frame rate and bit-depth.

19. A display apparatus for displaying an image based on video data transmitted from a transmission apparatus comprising:

a display configured to display an image; and a processor connected to the display, wherein the processor is programmed to:

receive list information of available interpolation data regarding a plurality of kinds of image quality for interpolating a difference between decoded video data in a first format generated by the transmission apparatus and video data in a second format being outputted to the display apparatus, select one of the kinds of interpolation data from the received list information, transmit selection information indicating the kind of interpolation data selected from the list information to the transmission apparatus, receive the video data in the second format and interpolation data generated by the transmission apparatus based on the selection information, from the transmission apparatus, and display an image on the display based on the received video data in the second format and the received interpolation data, wherein the list information received from the transmission apparatus is generated by the transmission apparatus based on a capacity of a transmission line connected the transmission apparatus to the display apparatus.

20. The display apparatus according to claim 19, wherein the display apparatus and the transmission apparatus are connected to communicate with each other via a HDMI line.

21. The display apparatus according to claim 19, wherein the plurality of kinds of image quality includes resolution, frame rate and bit-depth.

* * * * *